United States Patent [19]

Letts

[11] 4,181,379
[45] Jan. 1, 1980

[54] BEARING STRUCTURE LUBRICANT FEED SYSTEM

[75] Inventor: Robert A. Letts, Fleet, England

[73] Assignee: Airscrew Howden Limited, England

[21] Appl. No.: 859,151

[22] Filed: Dec. 9, 1977

[30] Foreign Application Priority Data

Oct. 4, 1977 [GB] United Kingdom ............... 41290/77

[51] Int. Cl.² ............................................. F16C 33/66
[52] U.S. Cl. .................................... 308/187; 308/240
[58] Field of Search .......................... 308/187, 76–78, 308/94, 95, 96, 106, 109–111, 121, 125, 99, 102, 104, 86, 171, DIG. 5, 240

[56] References Cited

U.S. PATENT DOCUMENTS

| | | | |
|---|---|---|---|
| 2,442,202 | 5/1948 | Hughes-Caley | 308/DIG. 5 |
| 3,804,476 | 4/1974 | Nakamura et al. | 308/187 |

FOREIGN PATENT DOCUMENTS 2609736  9/1977  Fed. Rep. of Germany ........... 308/187

Primary Examiner—Douglas C. Butler
Attorney, Agent, or Firm—Feldman & Feldman

[57] ABSTRACT

The invention provides a bearing structure with a lubricant circulation that does not depend on gravity. An absorbent lubricant reservoir contacts a conical shaft portion so as to convey lubricant from the reservoir to a ball or like bearing. Lubricant passing the bearing is flung off a rotating flange by centrifugal force to a collector and then fed back by wicks to the reservoir. Air circulation is also provided by fan blades on the flange drawing air through the bearing from the reservoir side and returning it through passages around the bearing.

14 Claims, 5 Drawing Figures

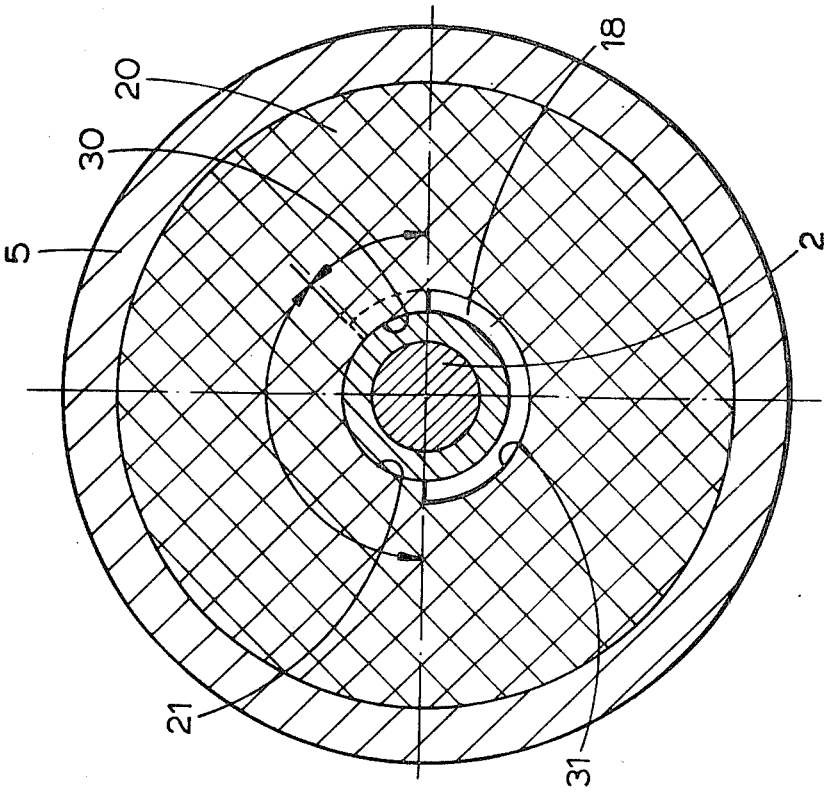
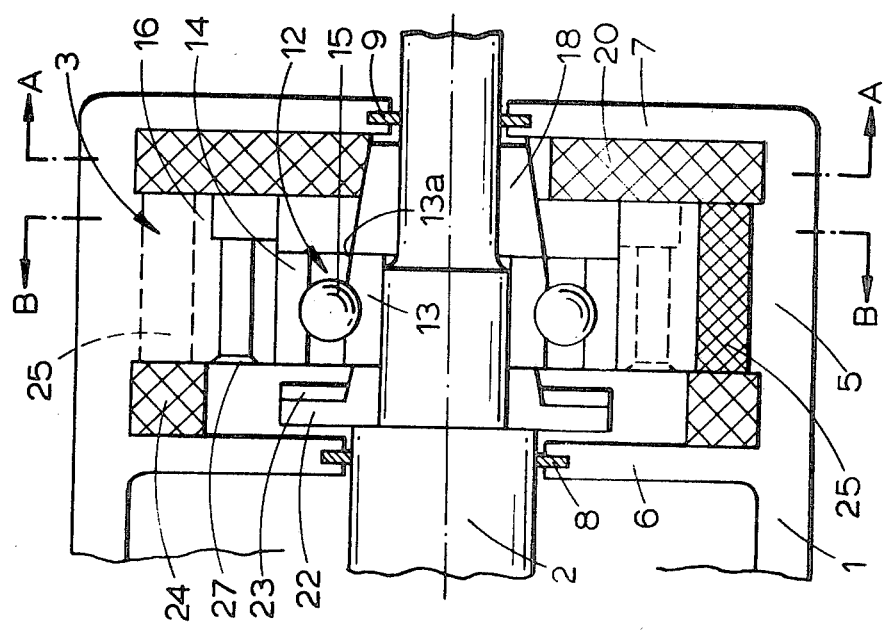

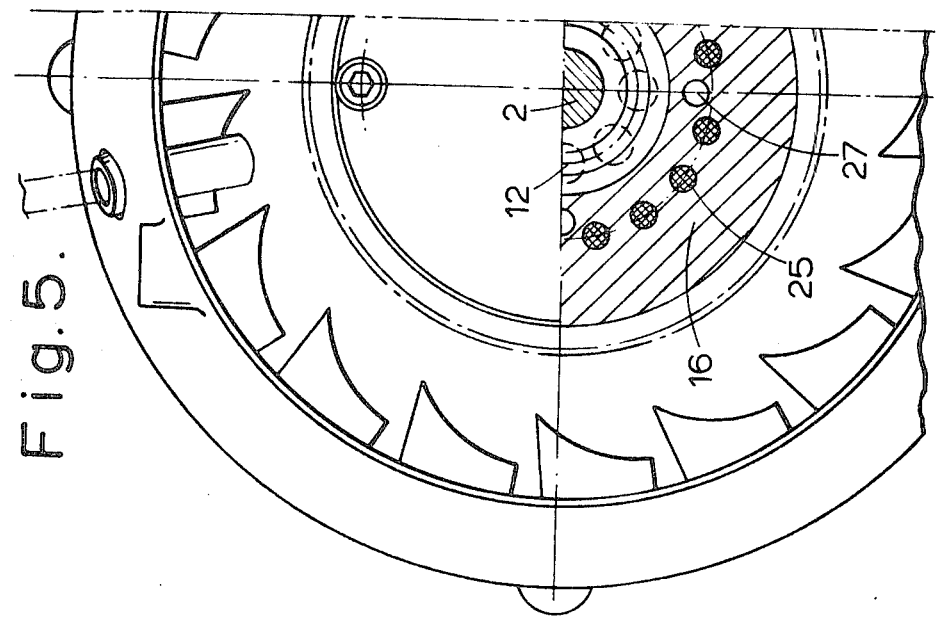
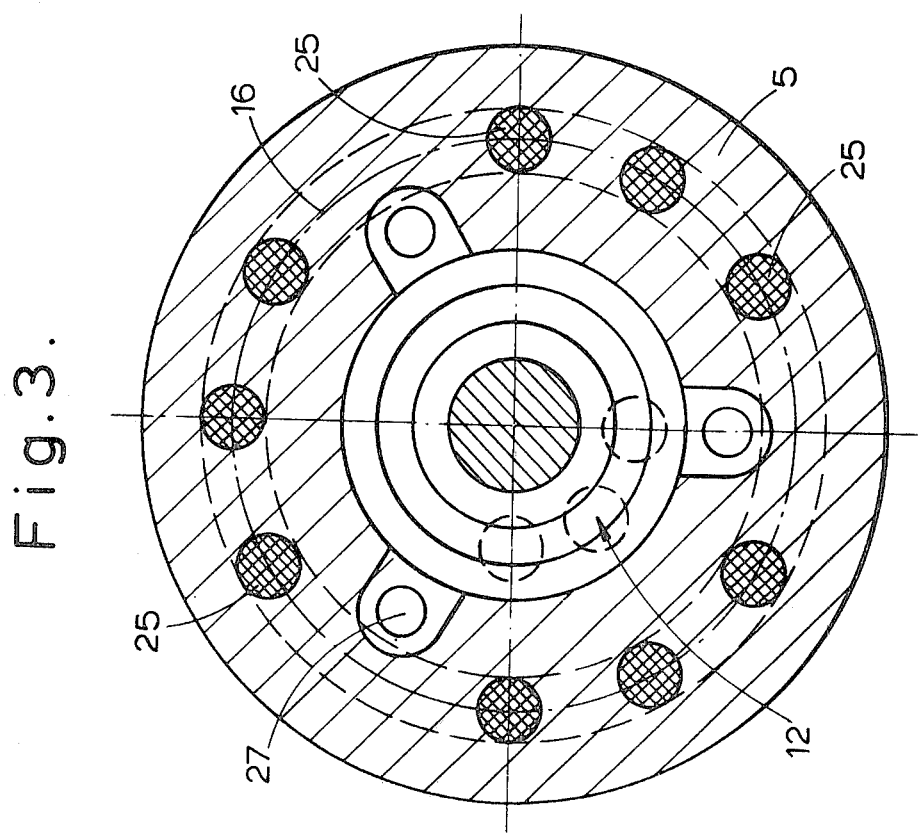

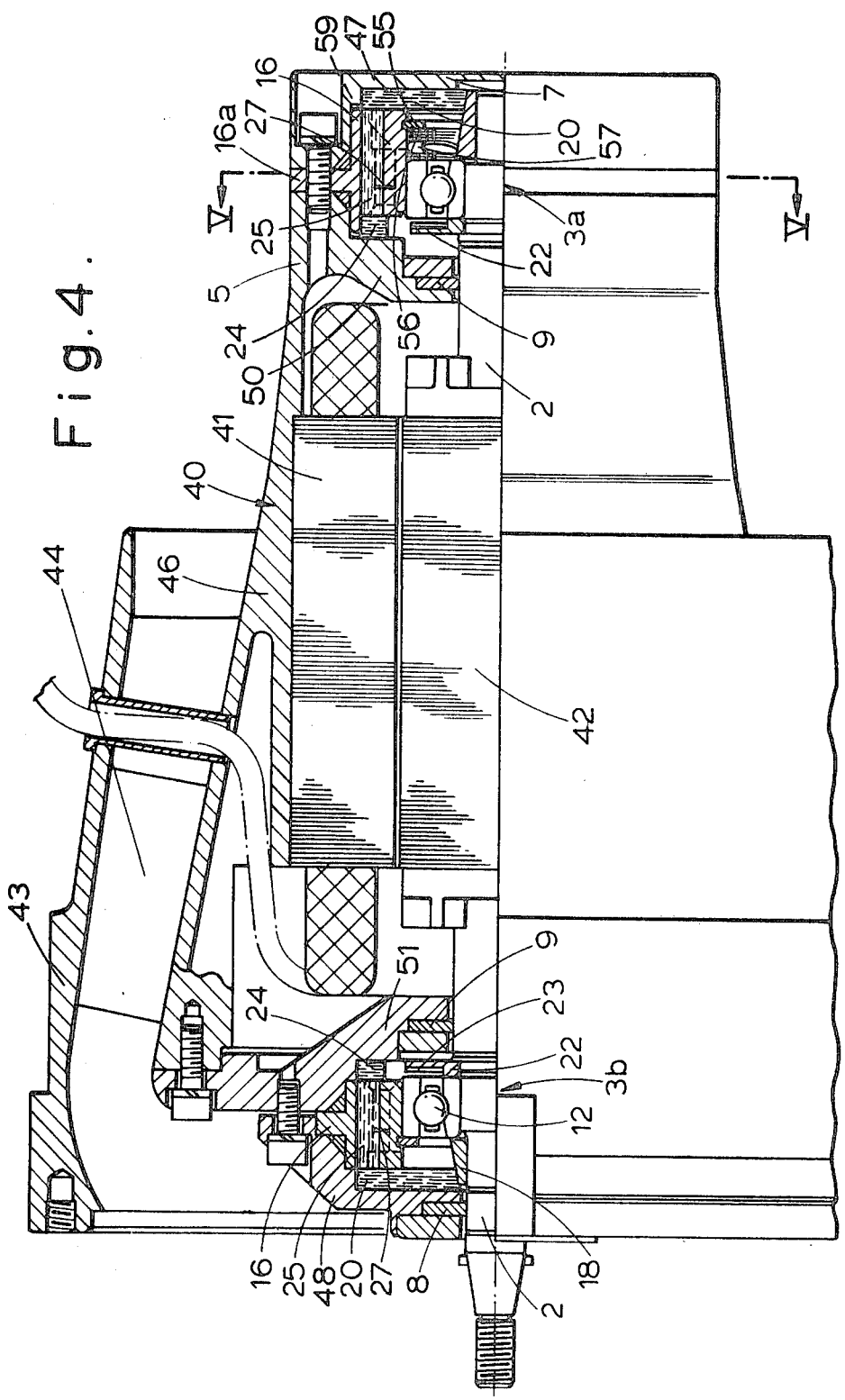

BEARING STRUCTURE LUBRICANT FEED SYSTEM

BACKGROUND OF THE INVENTION

This invention relates to bearing structures, more especially for relatively small high-speed machines. Bearings for small high-speed machines require, for reasonably long operating life, a circulation of lubricant.

Bearing structures with lubricant circulation are known. In one such arrangement the lubricant is fed to the bearing from a reservoir via a wick which makes contact with a groove in the shaft (or collar thereon) which the bearing supports. Some lubricant is moved centrifugally from the groove to the bearing, is flung off centrifugally and returns to the reservoir by gravity through drain passages.

Wick feed arrangements can work satisfactorily, but are subject to the basic limitation that only part of the lubricant available from the wick will be transferred to the bearing; also, rotation of the shaft will either tend to pull wick round with it or push it away out of contact depending on direction of rotation. Additionally the surface of the wick has to be held against the surface of the grooved collar with a controlled force which will allow for 'bedding down' of the wick without initial excess pressure (and friction) or eventual loss of effective contact.

Also, in the known bearing structure referred to since lubricant relies on gravity there will be attitudes in which lubricant circulation fails.

An object of the invention in one aspect is to provide a bearing structure with a self-contained lubrication system which is simple and robust and avoids the above-mentioned problems with the wick supply to the shaft.

In another aspect, the object of the invention is the provision of a lubricated bearing structure where lubricant will circulate in any attitude.

SUMMARY OF THE INVENTION

In a bearing structure wherein a shaft is supported for rotation with reference to a relatively fixed member on a row of orbitally moving rotating elements (such as balls or rollers, i.e, anti friction bearings,) and a lubrication system is provided for said elements, the invention provides:

- a generally conical shaft portion extending with increasing diameter from one side thereof to the row of rotating elements;
- a stationary lubricant reservoir made of absorbent material to supply lubricant to the conical shaft portion;
- a flange on the shaft portion at said other side;
- a stationary collector ring radially spaced from the flange to receive lubricant flung centrifugally thereby; and
- return means extending between the collector ring and the reservoir.

According to the invention, in one aspect, the lubricant reservoir is in direct contact with the conical shaft portion. This avoids the need for a wick with the attendant drawbacks explained above. It avoids also the need for a groove, so that all the lubricant can flow towards the bearing. The lubricant reservoir can take various forms, such as a block of porous material with a side in contact with the conical shaft portion. Preferably, however, the reservoir is an annular member with a central hole through with the conical shaft portion projects, the member being in contact with the shaft portion over only a part of the boundary of the hole so that lubricant is transferred to the shaft portion over the area of contact, and released for movement along the shaft portion where the member is out of contact therewith.

The invention, in another aspect, provides return means in the form of one or, preferably, several wicks leading from the collector ring to the reservoir. Thus lubricant circulation is by centrifugal force and capillary action and not dependent on gravity, so that the structure can be used in any attitude, or under zero-gravity conditions.

Preferably the flange is made to act as a fan, as by providing radial projections, to set up a flow of lubricant-mist entraining air through the row of rotating elements to the fan and back through holes in the member supporting such elements. This arrangement enables control of the lubricant particles which will in any case be thrown off in operation and ensures that all the lubricant delivered to the bearing is caused to flow through the row of rotating elements and emerge on the flange side.

In addition to the control of free particles of lubricant this air circulation serves to transfer heat from the hotter parts of the structure to the cooler parts, thus achieving a more uniform, and the lowest possible, temperature for the entire structure.

One embodiment of the invention will now be described with reference to the accompanying drawings.

DESCRIPTION OF THE DRAWINGS

FIG. 1 is an axial section of an end portion of a high-speed motor having a bearing structure, according to the invention illustrated somewhat diagrammatically, FIGS. 2 and 3 are transverse sections on the lines A—A, B—B in FIG. 1, FIG. 4 is a partial section of a fan motor incorporating bearing structures according to the invention shown in more detail than the previous figures, and FIG. 5 is a transverse section of the FIG. 4 motor on the line V—V in FIG. 4.

DESCRIPTION OF PREFERRED EMBODIMENTS

Referring to FIGS. 1 to 3, only one end of the high-speed motor is shown, including a housing designated generally 1 and a shaft 2 supported on a bearing structure designated generally 3 at the end of the motor shown, and a similar bearing structure at the other end, not shown. The motor construction, apart from the bearing structure 3, may be of known type and will not be described.

The bearing structure 3 is shown surrounded by a cylindrical end portion 5 of the motor housing 1 and spaced inner and outer radial walls 6, 7. Where the shaft 2 extends through these walls it is provided with oil seals 8,9.

Bearing structure 3 comprises a ball bearing indicated generally at 12 having the usual inner and outer races 13, 14 between which is a row of balls 15. The inner race supports the shaft directly. The outer race is mounted on an annular support member 16 which is shown in FIG. 3 as integral with the motor housing portion 5 but which may be separate therefrom and secured thereto.

The shaft 2 carries a shaft portion or collar 18 of conical formation extending from adjacent the outer housing wall 7 to the inner bearing race 13. Preferably, as shown, the adjacent surface 13a of the race is similarly conical and forms a flush continuation of the conical surface of the collar. The bearing 12 may be of the angular contact type used to take thrust load; such bearings have tapered races. The collar 18 can be designed to run flush up to the inner race. The preferred arrangement can therefore be achieved without special bearings.

However, it is not essential that the bearing race 13 and collar 18 present a continuous conical surface, and a conventional bearing can be used where the inner race defines a cylindrical contact surface. The collar 18 may extend up to the side of the inner race, the race thus presenting a shoulder at the larger end of the collar. Lubricant moving along the collar runs outwardly over the shoulder and on to the cylindrical surface of the inner race. The edges of this surface are usually somewhat rounded, which helps this movement. Some lubricant will be flung off at the shoulder, but due to the air circulation which is described later, most of this will be carried into the bearing. Even with the flush conical surface of collar 18 and race 13 as illustrated, a small amount of lubricant will be flung off, which will be blown into the bearing by this air flow.

A stationary lubricant reservoir 20 in the form of a disc with a hole 21 in it is located between the support member 16 and the outer housing wall 7, which it overlies. For convenience in assembly the disc 20 may be adhesively secured over a small area to the wall 7. The reservoir is in contact with the conical collar 18, as will be explained.

On the side of the bearing 12 opposite the collar 18 the shaft 2 carries a flange member 22 with radial projections 23 forming fan blades. The flange member will hereinafter be termed a "flinger", since its function is to fling lubricant centrifugally against a stationary collector ring 24 trapped between the support member 16 and the inner end wall 6 of the housing. The collector ring 24 is of absorbent material, for example the same material as constitutes the reservoir 20. The collector ring and reservoir are connected by a series of nine return wicks 25 contained in holes formed in the support member 16 and arranged in a ring as shown in FIG. 3. The support member 16 is formed with three holes 27 for circulation of air, as will be explained.

The bearing structure 3 operates as follows. Lubricant held in the reservoir 20 is transferred to the collar 18 as the latter rotates and travels up the cone by the effect of centrifugal force, to reach the row of rotating balls which are thereby lubricated. The lubricant continues its flow towards the flinger 22 whence it is transferred by centrifugal force to the collector ring 24. The lubricant then returns by means of the wicks 3 to the reservoir 20. Lubricant particles which are flung off are entrained in an air-flow set up by the fan blades 23 on the flinger and this flow takes place from right to left (as appears in the drawing) through the row of rotating balls 15, outwardly, and back through the air circulation holes 27.

The main lubricant reservoir 20 is a simply shaped porous medium which can readily be obtained to a desired specification controlling density, porosity, elasticity and other necessary characteristics. High density long wool fibre and white "engineering" felt are examples of preferred materials. A contact or transfer area 30 for the reservoir is formed by part of the boundary of the central hole 21 in the reservoir, which must be accurately cut and is undersize relative to the part of the conical collar 18 with which it is in contact: this gives the required contact pressure. The hole 21 in the reservoir can initially have the transfer area 30 of cylindrical or conical form since the porous medium will in any event adapt itself to the portion of the collar 18 which it contacts. Since the entire area of the collar 18 in contact with the reservoir 20 is conical, all lubricant in this area is subject to centrifugal force as it is rotated by the surface and will tend to flow along the surface in the axial direction which is towards the larger end of the cone, i.e. towards the bearing 12. As mentioned, only a part of the boundary of the hole 21 in the reservoir is in contact with collar 18 to form the lubricant transfer area. The boundary is recessed as shown at 31 to be clear of the collar and provide a lubricant release area.

The amount of lubricant flowing along the cone is controlled by the speed, the lubricant viscosity, the cone angle and the proportion of circumference at contact region devoted to the transfer and release. To explain the last point, consider an example where the entire circumference of the hole 21 was in contact with the collar 18. A meniscus of lubricant would form all around the large diameter end of the contact area, and depending on surface tension a small amount of lubricant would be released axially along the cone. For the case where half the boundary of the hole 21 was in contact, and half free, the lubricant film in the free region will be able to move axially along the cone due to centrifugal effect and will be clear of the contact area when it has rotated into that part of the circumference again. A smaller proportion of circumference in contact (say $\frac{1}{4}$) will give a longer time for lubricant film to get clear of contact area: but of course there must be a sufficient transfer area to get the lubricant on to the collar. There will be a ratio of transfer to release areas which will give a maximum flow of lubricant.

The profile of the collar 18 does not necessarily have to be a right cone (although for cost reasons this is preferable) but can be made up of different cone angles or be curved either convex or concave or any combination to give maximum lubricant transfer.

As will be appreciated, the lubricant circulation is dependent only on capillary action and centrifugal force. It is independent of gravity and the structure can therefore be used in any attitude and under zero gravity conditions.

The air circulation provided for controls the behaviour of lubricant particles, assisting in lubrication of the bearing 12 and cooling the hotter parts so that the bearing structure runs at the lowest possible temperature.

FIGS. 4 and 5 show by way of example a motor structure for a high speed fan employing the bearing structures shown in principle in FIGS. 1 to 3. Similar parts in the structure of FIGS. 4 and 5 are given the reference numbers of the earlier figures and will need no further description although shape and dimensions of the different parts may be different.

The motor of FIGS. 4 and 5 designated generally 40 comprises the usual stator 41 and the rotor 42 within the housing designated generally 1, the rotor being mounted on shaft 2 supported on bearing structures 3a, 3b at either end of the housing. The motor 40 is supported within a shroud ring 43 by stationary blades 44, the shroud and the exterior of the housing 1 providing an annular passage for air displaced by a fan rotor (not shown) on the left hand end of the shaft. The housing 1 comprises a central portion 46 and end caps 47, 48 and the bearing structures 3a, 3b are mounted between the respective end caps 47, 48 and generally radial wall portions 50, 51. Wall portion 50 is integral with the central housing portion 46 at one end and wall portion 51 is bolted thereto at the other and carries the end cap 48. It will be seen that the end caps 47, 48 and radial wall portions 50, 51 correspond generally with the walls 7 and 6 of FIG. 1.

The bearing structures 3a, 3b are slightly different. Turning first to the bearing structure 3a, this comprises a ball bearing 12 carried by an annular support member 16 having a radial flange 16a trapped between the end cap 47 and the end of the central housing portion 46 to which that cap is secured. The lubricant reservoir 20 is located between the end cap 47, the inner face of which it overlies, and the outer end of the support member 16. In the construction shown an an internal circlip 55 seated in a groove in the member 16 forms an end stop for axial location of the shaft 2. Shim washers 56 sandwiching a Belleville (or wavy) spring washer 57 space the bearing 12 from the end stop 55. Final location of the shaft can be varied by adding or removing shims. All washers 56, 57 have sufficient internal diameter for circulation of lubricant and air.

The collector ring 24 is trapped between the inner face of the support member 16 and the adjacent face of the wall portion 50. Sixteen wicks 25 extending as shown through the support member 16 parallel to the axis lead lubricant from the collector ring 24 to the lubricant reservoir 20. Four air passages 27 extend parallel to the axis through the member 16 and lead into slots shown chain-dotted at 59 and thence into the space to the right of the bearing 12 (as seen in the figure) around the shim washers 55. The milled slots 59 interrupt the internal seating surface available for the shim washers, but ample area is left for their proper location.

The bearing 12 is of the angular contact type with a taper on the inner race 13 facing the conical collar 18. However the collar does not in this case present a flush surface with the taper on the inner race. Oil leaving the collar 18 first flows radially and then over the rounded shoulder at the end of the taper.

The bearing structure 3b at the left of the motor 40 (as seen in the drawing) is similar to the structure 3a but lacks the washers 56 and 57. The bearing support member has a flange 16a trapped between the end cap 48 and wall portions 51.

By way of example only, the motor here illustrated is of 950 watts continuous rating, design speed 22,000 r.p.m.: the motor is suitable for ambient temperatures −40° C. to +50° C. or even to +75° C., and for applications involving vibration and shock loads. The invention, however, is applicable to both larger and smaller motors, and to other high speed machinery, for example high speed compressors, where the speeds may be far in excess of 22,000. The arrangement described is equally suitable for roller and needle bearings.

All the absorbent parts of the bearing structure are soaked in lubricant before assembly and excess removed: in addition the bearing is lubricated. A typical lubricant is the oil supplied by B.P. under the designation HLP 40. The bearing structure has been found to have a very long life without attention, as compared to a standard grease-lubricated bearing under similar conditions.

In a practical construction the bearing housings are generally of light alloy with some components of steel. The motor housing which will usually form part of the bearing housing may be of light alloy. The oil transfer cone 18 is typically of alloy (stainless) steel with controlled surface finish: it may be a fine-ground finish. Other materials are suitable provided the surface hardness and finish are correct. The porous medium for the lubricant reservoir ring and wicks may be "Mechanical" sheet felt to BS4060 Table 2, S4 MEDIUM FIRM, FINE WHITE or alternatively BS4060 Table 1 A.B.A. WHITE. The lubricant may typically be BP Limited's HLP 40, but less volatile non-oxidising fluids are preferred for longer life. The flinger 22 is preferably of light alloy (aluminium or magnesium) for minimum weight and maximum thermal conductivity. Where weight-saving is not vital, copper-base alloy, with greater conductivity for extraction of heat from the shaft, may be preferred. The rolling elements are typically of high precision standard (ABEC 9 or equivalent), for minimum heat generation and vibration, and maximum load capacity and life.

What is claimed is:

1. A bearing structure wherein a shaft is supported for rotation with reference to a relatively fixed member on a row of orbitally moving rotating elements and a lubrication system is provided for said elements, the structure including:
    a generally conical shaft portion extending with increasing diameter from one side thereof to the row of rotating elements;
    a stationary lubricant reservoir made of absorbent material and in contact with the conical shaft portion over an arc less than 360°;
    a flange on the shaft portion at said other side;
    a stationary collector ring radially spaced from the flange to receive lubricant flung centrifugally thereby; and
    return means extending between the collector ring and the reservoir.

2. A structure as claimed in claim 1, wherein the lubricant reservoir is a block of porous material having a portion in contact with said conical shaft portion.

3. A structure as claimed in claim 2, wherein the block has a central hole and surrounds said conical shaft portion with a portion of the block defining the boundary of the central hole in contact with said shaft portion.

4. A structure as claimed in claim 3, wherein said portion of the block is in contact with the shaft portion over only a part of the boundary of the hole.

5. A structure as claimed in claim 4, wherein the block has a side in contact with an end wall of the structure.

6. A bearing structure wherein a shaft is supported for rotation with reference to a relatively fixed member on a row of orbitally moving rotating elements and a lubrication system is provided for said elements, the structure including:
    a generally conical shaft portion extending with increasing diameter from one side thereof to the row of rotating elements;
    a stationary lubricant reservoir made of absorbent material and in contact with the conical shaft portion over an arc;
    a flange on the shaft portion at said other side;
    a stationary collector ring radially spaced from the flange to receive lubricant flung centrifugally thereby; and return means extending between the collector ring and the reservoir, wherein the return means is at least one wick extending between the collector ring and the lubricant reservoir.

7. A bearing structure wherein a shaft is supported for rotation with reference to a relatively fixed member on a row of orbitally moving rotating elements and a lubrication system is provided for said elements, the structure including:
  a generally conical shaft portion extending with increasing diameter from one side thereof to the row of rotating elements;
  a stationary lubricant reservoir made of absorbent material and in contact with the conical shaft portion over an arc;
  a flange on the shaft portion at said other side;
  a stationary collector ring radially spaced from the flange to receive lubricant flung centrifugally thereby; and
  return means extending between the collector ring and the reservoir, wherein the flange carries fan blades and the structure is formed with air passages extending from one side of the rotating elements outwardly thereof to the other, for circulation of air form one side past the rotating elements to the other side and thence back to said one side through said passages.

8. A bearing structure wherein a shaft is supported for rotation with reference to a relatively fixed member on a row of orbitally moving rotating elements and a lubrication system is provided for said elements, the structure including:
  a generally conical shaft portion extending with increasing diameter from one side thereof to the row of rotating elements;
  a stationary lubricant reservoir made of absorbent material to supply lubricant to the conical shaft portion over an arc;
  a flange on the shaft portion at said other side;
  a stationary collector ring radially spaced from the flange to receive lubricant flung centrifugally thereby; and
  at least one wick extending between the collector ring and the reservoir.

9. A structure as claimed in claim 8 wherein there is a plurality of wicks around the shaft.

10. A structure as claimed in claim 8 wherein the flange carries fan blades and the structure is formed with air passages extending from one side of the rotating elements outwardly thereof to the other, for circulation of air from one side past the rotating elements to the other side and thence back to said one side through said passages.

11. A structure as claimed in claim 8, wherein the lubricant reservoir is a block of porous material having a portion in contact with said conical shaft portion.

12. A structure as claimed in claim 11, wherein the collector ring and lubricant reservoir are sandwiched between a support member for the rotatable elements and respective end walls of the structure and a plurality of wicks extend between the ring and the reservoir through holes in the support member.

13. A bearing structure wherein a shaft is supported for rotation with reference to a relatively fixed member on a row of orbitally moving anti-friction bearing rotating elements and a lubrication system is provided for said elements, the structure including:
  a generally conical shaft portion extending with increasing diameter form one side thereof to the row of rotating elements;
  a stationary annular lubricant reservoir made of absorbent material and in contact with the conical shaft portion over an arc substantially less than 360°;
  a flange on the shaft portion at said other side;
  a stationary collector ring radially spaced from the flange to receive lubricant flung centrifugally thereby;
  a plurality of wicks extending between the collector ring and the reservoir,
  fan blades on the flange; and
  means providing air passages from adjacent the ring to adjacent the reservoir, for circulation of air from the fan blades through the passages and back past the rotating elements.

14. In a bearing structure comprising:
  a shaft,
  a relatively fixed member,
  bearing means comprising a row of orbitally moving rotating elements mounting the shaft with respect to said member,
  a lubrication system comprising:
    a stationary lubricant reservoir made of absorbent material,
    means to cause a flow of lubricant from the reservoir to the shaft at one side of the bearing means,
    a flinger flange on the shaft at the other side of the bearing means,
    lubricant return means to return to the reservoir lubricant flung out by the flinger flange.
  the improvement which consists in
    a conical shaft portion between the reservoir and the bearing means and
    the reservoir contacting said conical shaft portion over an arc less than 360° to provide the means to cause lubricant flow to the shaft.

* * * * *